(12) United States Patent
Karaki

(10) Patent No.: US 7,085,047 B2
(45) Date of Patent: Aug. 1, 2006

(54) MICROSCOPE STAGE

(75) Inventor: Kenji Karaki, Ina (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/794,272

(22) Filed: Mar. 4, 2004

(65) Prior Publication Data

US 2004/0169916 A1    Sep. 2, 2004

Related U.S. Application Data

(63) Continuation of application No. PCT/JP02/12827, filed on Dec. 6, 2002.

(30) Foreign Application Priority Data

Dec. 7, 2001    (JP)    ............................. 2001-374425

(51) Int. Cl.
   *G02B 21/26* (2006.01)
(52) U.S. Cl. ...................................... 359/391
(58) Field of Classification Search ............... 359/391, 359/393, 394, 368; 294/67.33; 74/490.13
   See application file for complete search history.

(56) References Cited

U.S. PATENT DOCUMENTS

| 2,474,163 | A | | 6/1949 | Riley |
| 2,698,554 | A | * | 1/1955 | Bauersfeld ................... 359/391 |
| 3,458,102 | A | * | 7/1969 | Zanger et al. ................ 228/3.1 |
| 4,137,356 | A | * | 1/1979 | Shoemaker et al. ..... 428/211.1 |
| 4,374,327 | A | * | 2/1983 | Christov ................. 250/442.11 |
| 5,566,021 | A | * | 10/1996 | Pettingell et al. ........... 359/391 |
| 6,206,805 | B1 | * | 3/2001 | Helton et al. .................. 482/52 |
| 6,561,378 | B1 | * | 5/2003 | Roessler et al. ............... 221/45 |

FOREIGN PATENT DOCUMENTS

| CN | 2447799 Y | 9/2001 |
| DE | 16 22 898 U | 4/1951 |
| JP | 57-192228 U | 6/1982 |
| JP | 5-127092 A | 5/1993 |
| JP | 6-11530 U | 2/1994 |
| JP | 9-154978 A | 6/1997 |

* cited by examiner

*Primary Examiner*—Mark A. Robinson
*Assistant Examiner*—Lee Fineman
(74) *Attorney, Agent, or Firm*—Frishauf, Holtz, Goodman & Chick, P.C.

(57)    ABSTRACT

A microscope stage includes a fixed stage, and a movable stage which is set slidably in contact with a predetermined plane of the fixed stage and which includes a surface having a large friction coefficient.

12 Claims, 4 Drawing Sheets

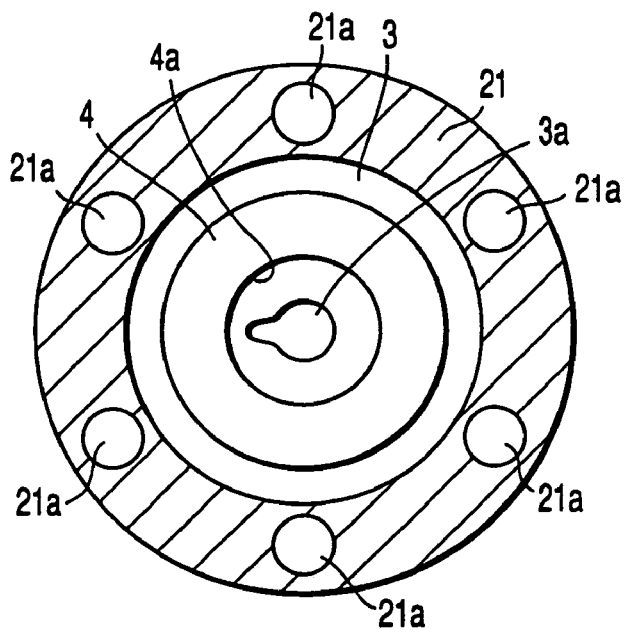
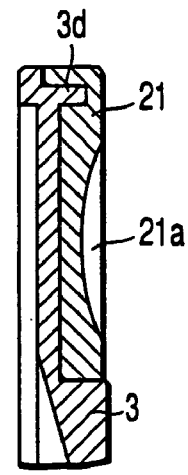
FIG. 5A
FIG. 5B
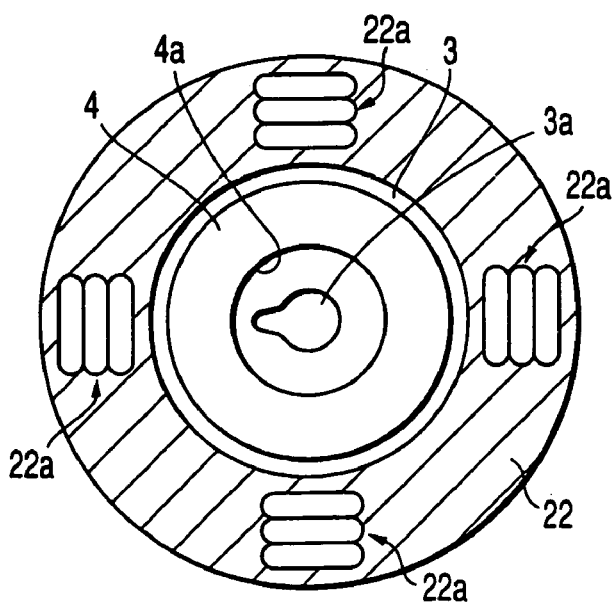
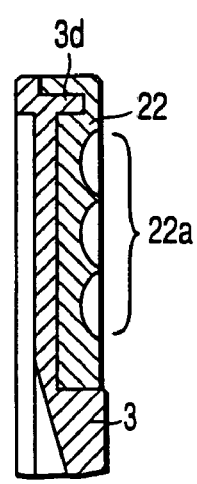
FIG. 6A
FIG. 6B

MICROSCOPE STAGE

CROSS-REFERENCE TO RELATED APPLICATIONS

This is a Continuation Application of PCT Application No. PCT/JP02/12827, filed Dec. 6, 2002, which was not published under PCT Article 21(2) in English.

This application is based upon and claims the benefit of priority from prior Japanese Patent Application No. 2001-374425, filed Dec. 7, 2001, the entire contents of which are incorporated herein by reference.

BACKGROUND OF THE INVENTION

1. Field of the Invention

The present invention relates to a microscope stage used in a microscope, and more specifically to a microscope stage on which a sample mainly such as a living thing or living cell is placed, and which is moved so as to observe a desired section of the sample under microscope.

2. Description of the Related Art

Recently, the functional analysis of live cells is becoming widely popular. Among various functional analyzing methods, a so-called injection method in which a gene, fluorescent dye or the like is injected in a cell with a micro-needle and the behavior thereof is analyzed while observing the living cell or living thing, is carried out in the field of physiological researches.

In the case of this method, a cell (to be called "sample" hereinafter) is moved not only frontward, backward, leftward and rightward as ordinary methods, but also there is a demand of making it possible to move it horizontally along a rotating direction so as to determine the needle inserting direction.

A sample is moved as described above in any manner by means of the stage. However, in most of the cases of ordinary microscope stages, the movements in the frontward, backward, rightward and leftward directions are realized by moving each of the axes independently. For this reason, in most of the microscope stages, they can be rotated but the rotation center is always set at one point. With use of such a stage, it is not possible to smoothly carry out a series of operations as described above. In other words, in order to move the sample to a desired location, the movements in the frontward and backward directions, and the movements in the rightward and leftward directions must be carried out independently. Further, if a sample is to be rotated after it is moved to a desired location, the sample will move out of the view immediately after the sample is rotated, unless the sample can be rotated around the center of the view presently observed.

In order to improve such a drawback, a gliding stage such as shown in FIG. 1 has been proposed.

FIG. 1 is a diagram showing an example of an inverted microscope to which a gliding stage is applied. A gliding stage 102 is provided to a main body 101 of the microscope. The gliding stage 102 includes a disk-like upper stage 102a and a lower stage 102b. The upper stage 102a has a plurality of manipulation knobs 103 mounted thereto. On an upper surface of the lower stage 102b, a projecting portion 104 is provided along a circumferential direction of the stage. The upper stage 102a is placed such that the bottom surface thereof is brought into contact with the upper end of the projecting portion 104. Here, grease is uniformly applied on the bottom surface of the upper stage 102a. In this manner, the user is able to freely move the upper stage 102a placed on the upper end of the projecting portion 104 of the lower stage 102b by means of the manipulation knobs 103. With the slide resistance acting between the contact surfaces of the upper stage 102a and the lower stage 102b, the upper stage 102a is held such that it cannot be moved excessively in a horizontal direction. Thus, the user can rotate the upper stage 102a with the manipulation knobs 103, thus making it possible to rotate it horizontally around an arbitrary position.

Underneath the gliding stage 102, an objective lens 106 mounted to a revolver 105 is provided. Above the gliding stage 102, a condenser 107 and a lamp house 108 mounted to a post 101a are provided. Illumination light from the lamp house 108 is irradiated through the condenser 107 onto a sample 109 on the gliding stage 102, and then passes through the objective lens 106. In the end, an image is observed with the ocular lens 110. Then, with reference to the observed image obtained through the ocular lens 110, the upper stage 102a of the gliding stage 102 is moved by manipulating the manipulation knobs 103, and thus the sample 109 is moved to an appropriate position, where a needle 111 is inserted into the sample 109 to carry out an injection.

It should be noted here that in the case where the gliding stage 102 is manipulated, the operability of the upper stage 102a by hand is important. In the case of microscopic examination at a high magnification in particular, a very fine stage movement creates a large motion in the field of view. Therefore, it is difficult to move the sample 109 quickly to a desired location.

However, in the case of the above-described gliding stage 102, the manipulation of the upper stage 102a with the manipulation knobs 103 is to move the upper stage 102a by means of the manipulation knobs 103. This structure creates such a drawback that fine manipulations cannot be smoothly carried out. To avoid this drawback, the upper stage 102a is manipulated by placing a finger on the upper surface thereof, and the lower stage 102b is manipulated by placing another finger thereon, without using the manipulation knobs 103. In this manner, fine movements can be carried out relatively easily. However, in general, the upper stage 102a is made of a metal and the upper surface thereof is slippery. Therefore, there has been such a drawback that it is difficult to manipulate the stage by putting a fingertip on it, and the stage cannot be smoothly operated due to the loss created by a slipped portion.

BRIEF SUMMARY OF THE INVENTION

The microscope stage according to an aspect of the present invention includes a fixed stage, and a movable stage which is set slidably in contact with a predetermined plane of the fixed stage and which includes a surface having a large friction coefficient.

BRIEF DESCRIPTION OF THE SEVERAL VIEWS OF THE DRAWING

FIGS. 5A and 5B are diagrams showing a brief structure of a microscope stage according to the second embodiment of the present invention.

FIGS. 6A and 6B are diagrams showing an alternate version of the second embodiment of the present invention.

DETAILED DESCRIPTION OF THE INVENTION

Embodiments of the present invention will now be described with reference to accompanying drawings.

(First Embodiment)

Figure 2:
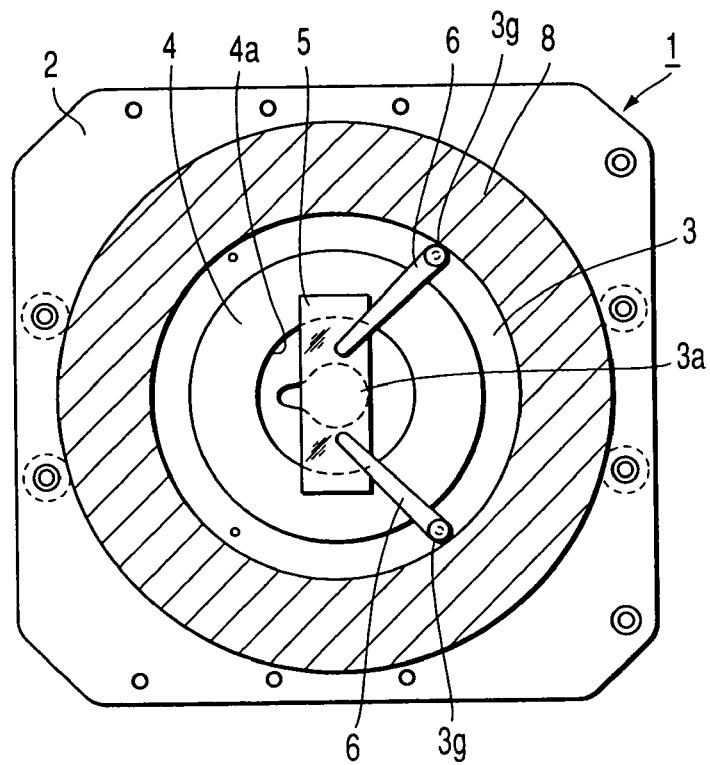
FIG. 2 is a diagram showing a top view of a microscope stage according to the first embodiment of the present invention.
Figure 3:
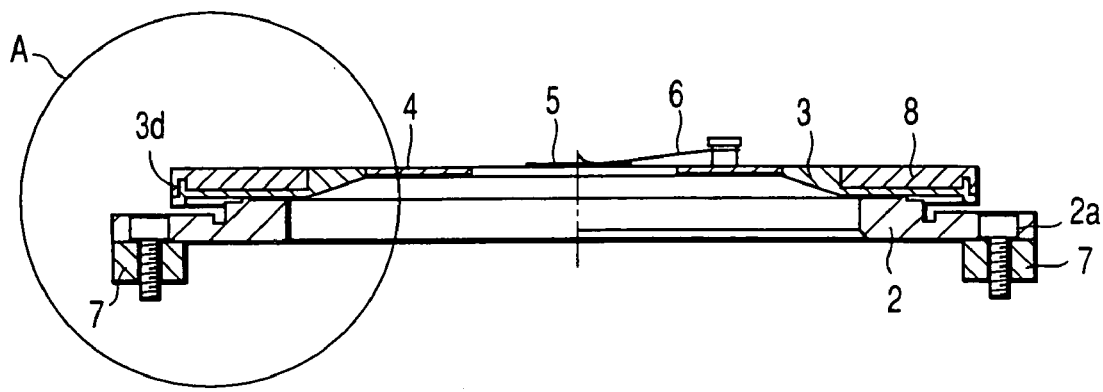
FIG. 3 is a diagram showing a side view of the microscope stage according to the first embodiment of the present invention.

FIG. 2 is a top view of the microscope stage according to the first embodiment of the present invention, and FIG. 3 is a diagram showing a sectional view of what is shown in FIG. 2 when viewed from the side.

Figure 1:
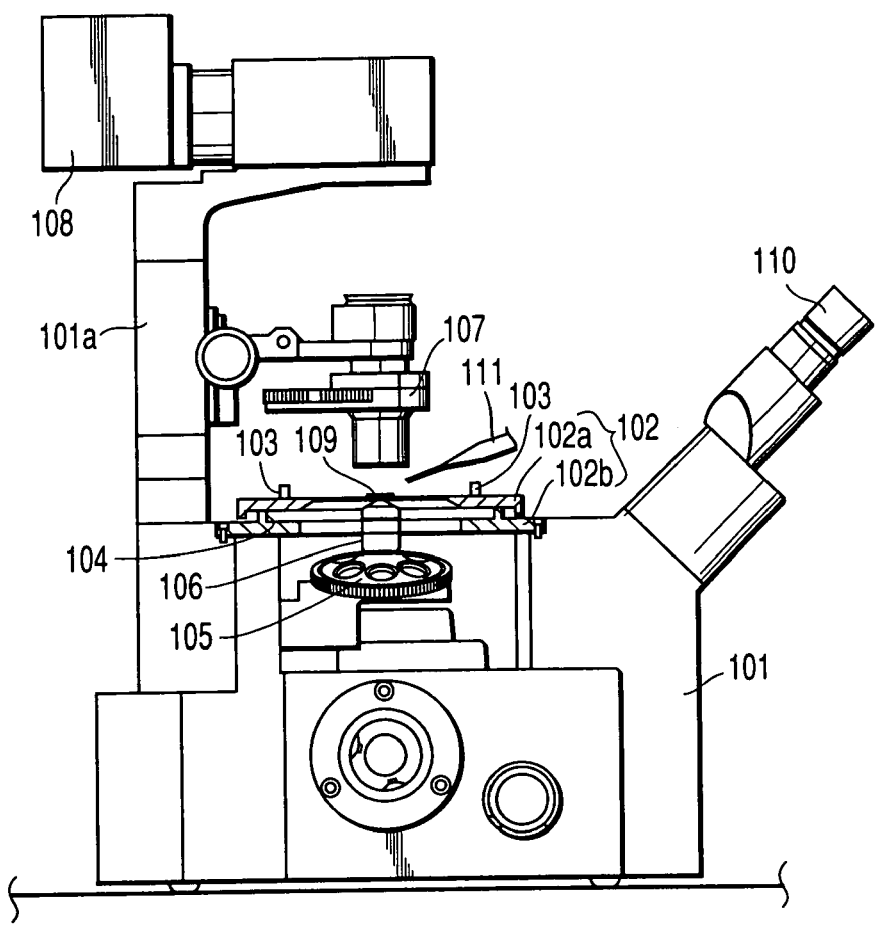
FIG. 1 is a diagram showing a brief structure of an inverted microscope to which a conventional gliding stage is applied.

It should be noted that a microscope stage of this type can be applied to the stage of the inverted microscope shown in FIG. 1, and the explanation for the inverted microscope provided here should be assisted by what is shown in FIG. 1.

In FIG. 2, a gliding stage 1 comprises a lower stage 2 that serves as a fixed stage and is made of a plate-like member such as a rectangular aluminum plate, and an upper stage 3 that serves as a movable stage placed on the lower stage 2 and is made of a metal-made disk member.

The upper stage 3 has a circular hole 3a at a center thereof. A thin disk-like central seat 4 having a hole 4a that passes light therethrough is plugged at the center of the hole 3a. A sample 5 is placed at the center of the central seat 4, and the sample 5 is fixed thereat by means of a clip 6 so as not to move.

The clip 6 has a plate spring-like member. The clip 6 has a shaft (not shown) on a proximate portion side. By inserting the shaft to a fitting hole 3g provided on the side of an upper stage 3, the clip 6 is rotatable around the shaft. Thus, the clip 6 can clamp the sample 5 by its tip end portion while changing its position.

Figure 4:
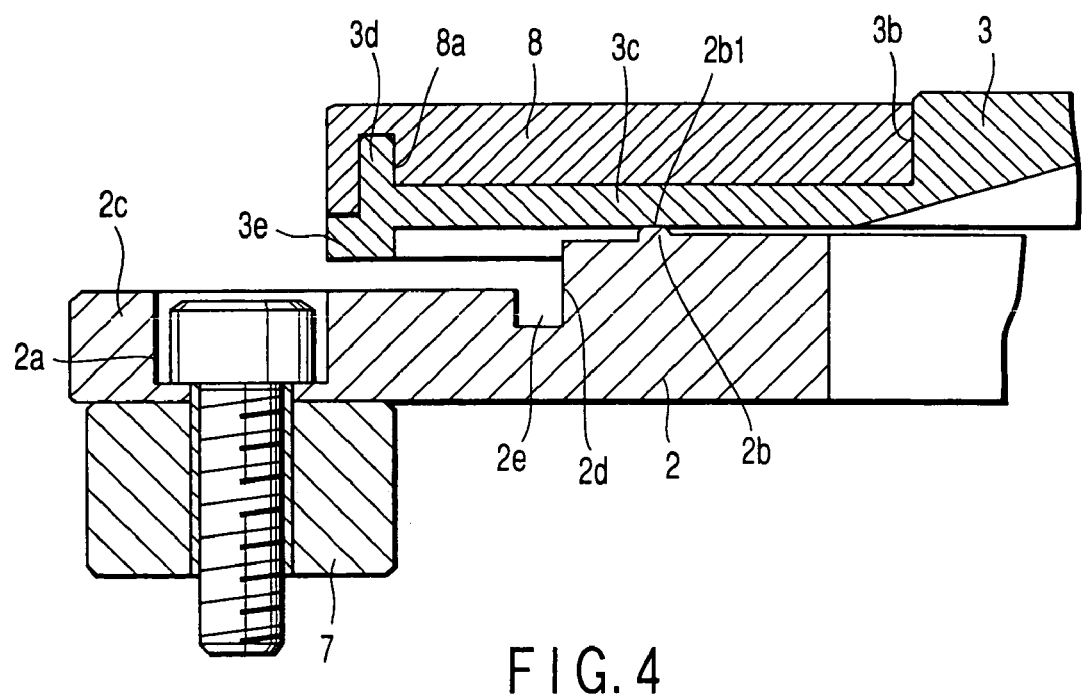
FIG. 4 is a schematic diagram showing an enlarged view of a main portion (portion A) of the first embodiment.

The lower stage 2 has a countersunk hole 2a at a circumferential portion of the stage as shown in FIG. 4. FIG. 4 is a detailed view of the section A of FIG. 3. Further, the lower stage 2 is fixed to the main body of the microscope (not shown) through a spacer 7.

An expanded portion 2b having a flat surface 2b1 is integrally formed along a circumferential direction of a central portion of the upper surface of the lower stage 2. The upper stage 3 is placed on the flat surface 2b1 of the expanded portion 2b.

Here, the flat surface 2b1 on the expanded portion 2b and the bottom surface of the upper stage 3 are processed with high profile irregularity. Thus, even in the case where the upper stage 3 is moved, the contact surface to the flat surface 2b1 is always in intimate contact with the bottom surface of the upper stage 3 in its entirety. A grease having a relatively high viscosity is thinly and uniformly applied between the bottom surface of the upper stage 3 and the flat surface 2b1 of the expanded portion 2b on the side of the lower stage 2, which are brought into contact with each other.

A thin part 3c is formed along an outer peripheral portion of the stage via a step portion 3b on the upper surface of the upper stage 3. In addition, a projection 3d, in this embodiment, a barrier-like projection 3d, is formed along a periphery of the thin part 3c.

On the upper surface of the upper stage 3, a hollow disk-like grip 8, which functions as a manipulation member, is formed on and along the thin part 3c of the upper stage 3. Here, the grip 8 is made of an elastic member having a predetermined thickness, such as of silicon rubber. An inner circumferential surface of the grip 8 is fit with the step portion 3b on the side of the upper stage 3. The grip 8 is detachably attached to the upper surface of the upper stage 3 by fitting a recess portion 8a made along the outer peripheral portion to the projection 3d. Further, the outer periphery of the grip 8 has such a structure of interposing the projection 3d therein. This structure assists to prevent the grip 8 from being greatly deformed by the force applied from fingertips when the user carries out such an operation of shifting the stage 3 with the fingertips. With the above-described structure, the grip 8, as it is, has such a friction coefficient that makes fingertips sufficiently non-slippery. Further, it is preferable that the surface of the upper surface side of the upper stage 3 should be processed such as to increase the friction coefficient, which makes the fingertips non-slippery, by, for example, a fine irregularity process.

In this case, the surface of the grip 8 is situated lower than the placement table of the sample 5, where the center seat 4 at the central portion of the upper stage 3 is plugged. In other words, the placement surface of the sample 5 at the central portion of the upper stage 3 is situated higher than the level of the surface of the grip 8. With this structure, even if the sample 5 (slide glass), which is not shown, is slid, it does not collide with the grip 8. Therefore, the sample 5 is slid on the upper stage 3 and then a step created due to the difference in level between the upper stage 3 and grip 8 is utilized, thus making it possible to facilitate the replacement of the sample 5 on the upper stage 3.

The upper stage 3 has a circumferential wall 3e extending downward from the contact surface with the lower stage 2, at the outer peripheral portion. The circumferential wall 3e of the upper stage 3 serves as a stopper for a moving stroke of the upper stage 3. In other words, as the upper stage 3 is moved on, the circumferential wall 3e is blocked by the step portion 2d of the lower stage 2, thus stopping the movement of the upper stage. Further, the circumferential wall 3e projects to a position close to the upper surface of the lower stage 2, and thus it has a role of preventing the entrance of dusts, dirt and the like from the lateral direction of the upper stage 3. With this structure, it is possible to avoid the deterioration of the operability that is caused by the entrance of dusts, dirt and the like between the contact surfaces of the upper stage 3 and the lower stage 2.

The lower stage 2 has a groove portion 2e formed by way of the step portion 2d along the proximal portion of a protruding portion 2c protruding outward from the upper stage 3, that is, around the expanded portion 2b on which the upper stage 3 is placed. The step portion 2d also serves as a stopper for the circumferential wall 3e of the upper stage 3. Further, the groove portion 2e has such a function that it catches liquids such as agents and physiological saline if they are spilled on the upper stage 3, so as to prevent the damage caused to the slide surfaces of the upper stage 3 and lower stage 2 by the liquids even at worst.

With the structure described above, the user carried out the following operation to move the sample for observation to the proximal position from the state of monitoring the sample 5 under microscope. That is, the user places a fingertip lightly on the upper surface of the grip 8 and moves the upper stage 3 directly to a desired direction while the grip 8 is slightly pressed downward with the fingertip.

In this operation, the upper stage 3 is not moved abruptly due to the slide resistance acting on the contact surfaces of the upper stage 2 and lower stage 2, and thus it can be moved slowly and smoothly due to the lubrication effect of the grease.

Then, when the user separates the finger from the grip 8 at a position where the upper stage 3 is moved to a desired position, the upper stage 3 stops immediately at the position. Here, if an elastic member such as silicon rubber is used as the grip 8, a large friction resistance can be obtained between the fingertip and the grip 8. Therefore, even if the fingertip operates to move the upper stage 3, the fingertip will not slip on the grip 8. Thus, in such a case of observation at a high magnification where the sample is to be moved finely and quickly, not only the grip 8 but also the upper stage 8 can be made to accurately follow up fine movements of the fingertip, thus making it possible to significantly improve the operability. In this embodiment, the width of each of the flat surface 2$b$1 of the expanded portion 2$b$ of the lower stage 2 and the contact surface of the upper stage 3 is, for example, about 1 mm. When the width of the expanded portion 2$b$ of the lower stage 2 is set to be wide, the contact area increases and therefore the required amount of force for sliding increases. Thus, the force that is required to move the stage increases. On the other hand, when the contact area narrows, the stage can be moved more lightly.

In the case where the user wishes to move the sample finely, it is possible that the outer circumferential portion of the upper stage 3 is slightly pushed horizontally. Further, in order for the case where the user wishes to move the sample 5 quickly and greatly when observing it at a low magnification, the grip 8 is provided on the outer peripheral portion of the upper stage 3. Therefore, even if the outer peripheral portion of the upper stage 3 is pushed, the fingertip does not slip and thus the sample 5 can be moved accurately and finely. Here, when the outer peripheral portion of the grip 8 is pushed, a force is applied to the projection 3$d$ formed along the periphery of the thin part 3$c$ on the upper surface of the upper stage 3, and thus the upper stage 3 is moved. Here, let us suppose that there is not projection 3$d$ and the grip 8 has a flat shape. In such a case, when the outer peripheral portion of the grip 8 is pushed, the grip 8 is deformed such that the grip 8 lifts up, and therefore the upper stage 3 cannot be moved at a high response. For the same reason as this, if the grip 8 is a thin sheet-like member, the grip 8 is curled up when the upper stage 3 is moved while displacing it with the fingertip placed on the upper surface of the grip 8. Thus, in this case as well, the upper stage 3 cannot be moved at a high response. However, in the first embodiment, the grip 8 is made thick, such a drawback can be overcome.

In the above-provided explanation, the movement of the upper stage 3 includes the rotation of the upper stage 3 in the horizontal direction, and the same arguments can be applied to the case where the upper stage 3 is rotated.

As described above, the upper stage 3 has the circumferential wall 3$e$ extending downward from the contact surface with the lower stage 2, at the outer peripheral portion. The circumferential wall 3$e$ serves as a stopper for the stroke, and has a function of preventing the entrance of dusts, dirt and the like from the lateral direction of the upper stage 3. With this structure, it is possible to move the upper stage 3 within a predetermined range, and at the same time, to prevent such a drawback that the operation of the stage is deteriorated due to the entrance of dusts, dirt and the like between the contact surfaces of the upper stage 3 and the lower stage 2.

The lower stage 2 has the protruding portion 2$c$ protruding outward from the upper stage 3. The groove portion 2$e$ is formed by way of the step portion 2$d$ in the proximal portion of the protruding portion 2$c$, along the periphery of the protruding portion 2$b$ on which the upper stage 3 is placed. With this structure, even if liquids such as agents and physiological saline are spilled on the upper stage 3, it is possible to prevent the damage caused to the slide surfaces of the upper stage 3 and lower stage 2 by the liquids even at worst.

On the other hand, in case where a liquid or solid such as powder is spilled onto the upper stage 3 or grip 8, the friction resistance of the surface of the grip 8 is significantly lowered, thereby making it slippery. In such a case, the grip 8 is removed from the upper stage 3, and washed with water. After drying, the grip can be mounted back to the upper stage 3, and thus the friction resistance as before can be recovered. Even in the case where the grip 8 is deteriorated or damaged for some reason, it suffices if merely the grip 8 is replaced with another, and thus, the stage can be used with a performance as good as before.

(Second Embodiment)

FIGS. 5A and 5B are diagrams showing a brief structure of the second embodiment of the present invention. The same structural elements as those shown in FIG. 2 will be designated by the same reference numerals, and the detailed explanations therefor will not be repeated here.

In FIGS. 5A and 5B, a grip 21 is detachably provided on an upper surface of an upper stage 3. On an upper surface of the grip 21, which is a portion of the upper stage, on which the user places his or her hand directly, a plurality of (six in the case shown) round recesses 21$a$ are formed at equal intervals along the circumferential direction. In this case, the grip 21 has a thickness as shown in FIG. 5B, and is a molded article formed with use of a mold into a shape shown in the figure. In this manner, the recesses 21$a$ can be provided easily and at low cost by use of a mold.

In the case where the grip 21 having such a structure as described above is used, the user places his or here fingertips of one or both hands on the upper stage 3 while the user hooks the fingertips in recesses 21$a$. Then, when the upper stage 3 is being moved, the inner surfaces of the recesses 21$a$ are pressed. In this manner, the stage can be moved laterally more easily than the case where a flat plane is moved horizontally. Further, in order to rotate the upper stage 3 horizontally, the user sticks, for example, a fingertip of the right hand, in a lower portion of a recess 21$a$ situated on the right-hand side, and a fingertip of the left hand, in an upper portion of a recess 21$a$ situated on the left-hand side. Then, the user applies a force slightly, thereby making it possible to rotate the upper stage 3.

The size, number, depth and shape of the recesses 21$a$ can be arbitrarily changed in order to improve the above-described advantageous effect. For example, as shown in FIGS. 6A and 6B, it is possible that the grip 22 detachably provided on the upper surface of the upper stage 3 is formed to have a plurality of finger shaped recesses 22$a$ made respectively in a plurality of sites (four sites in the case shown in these figures) that are placed at equal intervals along its circumferential direction.

As described above, when the upper stage 3 is operated with a plurality of fingertips placed on recesses 22$a$ of the grip 22, the area of the portion of the elastic member that is brought into contact with the fingers is increased. Thus, the friction resistance between the grip 22 and the fingertips is further increased, thus making it possible to operate the upper stage 3 even at a higher response.

In the second embodiment, the recesses 21a and 22a are formed on only the upper surfaces of the grips 21 and 22, respectively, which are detachably provided on the upper surface of the upper stage 3. It is alternatively possible that recesses are made on the outer circumferential surface of the upper stage 3. With this structure, it is possible to operate the movement of the upper stage 3 by hooking fingertips on recesses made in the outer circumferential surface of the upper stage 3.

(Third Embodiment)

Figure 7A:
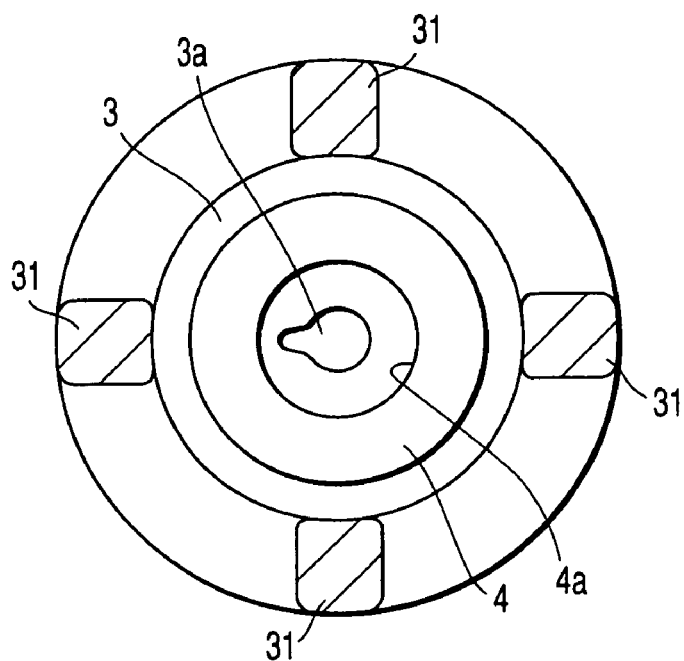
FIGS. 7A and 7B are diagrams showing a brief structure of a microscope stage according to the third embodiment of the present invention.
Figure 7B:
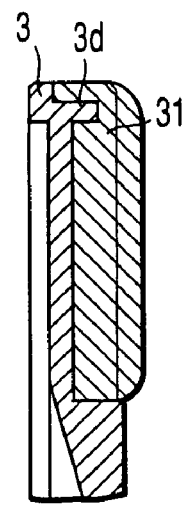

FIGS. 7A and 7B are diagrams showing a brief structure of the third embodiment of the present invention. The same structural elements as those shown in FIG. 2 will be designated by the same reference numerals, and the detailed explanations therefor will not be repeated here.

In the third embodiment, a plurality of (four in the example shown in these figures) grips 31 are provided on the upper surface of the upper stage 3 along its circumferential direction at equal intervals. The grips 31 are provided such as to project slightly from the upper surface of the upper stage 3 along with the radial direction of the upper stage 3, and thus a large friction resistance for the fingertips can be obtained.

Here, the projecting amount of the grips 31 is limited to a degree that the injection or basic operations of the stage or sample is not interfered with. Thus, it is possible to move the stage by putting fingertips on the projecting grips 31 or while pinching one with fingertips. In this manner as well, the operability of the upper stage 3 can be enhanced.

In the third embodiment, the grips 31 are provided only on the upper surface of the upper stage 3; however it is alternatively possible that the grips 31 are provided on the outer circumferential surface of the upper stage 3. In this manner, it is possible to operate the movement of the upper stage 3 by hooking fingertips on the grips 31 made on the outer circumferential surface of the upper stage 3.

(Fourth Embodiment)

Figure 8A:
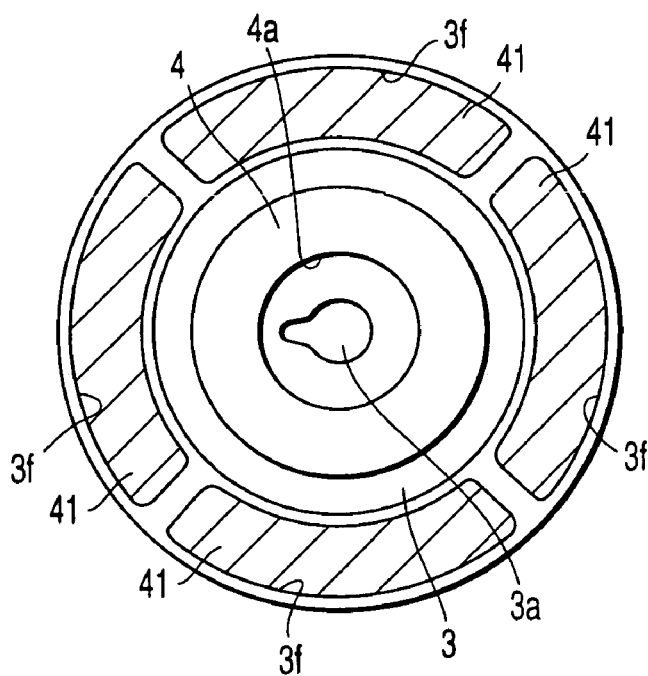
FIGS. 8A and 8B are diagrams showing a brief structure of a microscope stage according to the fourth embodiment of the present invention.
Figure 8B:
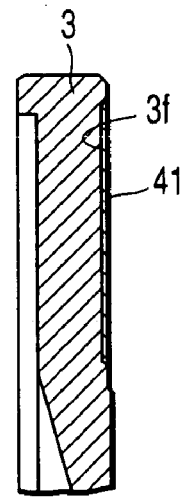

FIGS. 8A and 8B are diagrams showing a brief structure of the fourth embodiment of the present invention. The same structural elements as those shown in FIG. 2 will be designated by the same reference numerals, and the detailed explanations therefor will not be repeated here.

In the fourth embodiment, there are no projections 3d provided on the upper surface of the upper stage 3 to fit with grips 8 as described in FIG. 2, and the upper surface of the upper stage 3 has a flat shape. In place, as shown in FIG. 8A, a plurality of (four in the example shown in these FIGURES) recess portions 3f are formed in the upper surface of the upper stage 3 along its outer peripheral portion at equal intervals, and an elastic member 41 such a rubber sheet is adhered in each of the recess portions 3f. In this case, each of the elastic members 41 has a thickness of about a few millimeters, and the friction resistance of the surface of each member is high and an adhesive is applied on the rear surface thereof. Such an elastic member 41 is adhered in each of the recess portions 3f and thus the surface of the elastic member 41 is leveled with the upper surface of the upper stage 3. Further, the portion where the elastic member 41 is adhered on has a very high friction resistance. Therefore, the movement of the upper stage 3 is controlled while putting fingertips on the elastic members 41. In this embodiment, there are four elastic members 41 provided on the upper surface of the upper stage 3 along the outer peripheral portion at equal intervals; however the number of the elastic members 41 may be two, or more or less, or the shape of the members may be different from that of this embodiment.

In the fourth embodiment, the rear surface of the elastic member 41 is adhered with an adhesive to the upper stage 3. Therefore, even if the upper stage 3 is moved by fingertips to displace laterally on the elastic member 41, it is possible to prevent the curling up of the elastic member 41, and thus its high response operation will not be deteriorated. Further, since the elastic member 41 is divided into a plurality of sections, it suffices if only a worn out section is replaced with a new one when the worn out member 41 is to be removed and replaced with a new member. Thus, the operation cost can be reduced. When manufacturing the elastic member 41, there will be less waste of material if the member is divided into small parts than the case where one donut shaped member is prepared, thus making it possible to manufacture it at a low cost. Further, when a tape-like thin-elastic member 41 is adhered also onto the outer circumferential surface of the upper stage 3 as in the case of the upper surface with use of the adhesive of the rear surface, an advantageous effect similar to the above can be obtained even if the fingertips are put on the outer circumferential surface of the upper stage 3 to operate the stage.

In the first to third embodiments, the grips are detachable and a material that can be repeatedly used by washing it is employed, whereas in the fourth embodiment, a low-cost elastic member 41 is employed as a disposable part, thus achieving a similar advantage to that of the other embodiments.

In the first to fourth embodiments described above, the grips and elastic members are provided on the upper surface and outer circumferential surface of the upper stage 3; however it is alternatively possible that a manipulation portion having a high friction coefficient is formed directly on the upper surface and outer circumferential surface of the upper stage 3.

In the first embodiment, silicon rubber is used as a material having a high friction coefficient. However, the present invention is not limited to this in particular, but a fluororubber having an excellent oil resistance property, a butyl rubber having an excellent resistance to shock and wear-off due to repetitious use, or a resin material processed to increase its friction coefficient may be employed.

Further, it is possible that a surface having a high friction coefficient is formed on the upper surface of the lower stage 2. With this structure, when the user places his or her hand on the surface having a high friction coefficient of the upper surface of the lower stage 2 while manipulating the upper stage 3, the fine movement of the upper stage 3 can be carried out even at a more stable manner. Furthermore, it is alternatively possible that the surfaces of the upper stage 3 and lower stage 2 are formed to have some irregularity.

The present invention is described with reference to the examples where it is applied to the inverted microscope; however the present invention is not limited to this, but it can be applied to an erected microscope.

Apart from the above, the present invention is not limited to the above-described embodiments, but it can be modified into various versions as long as the essence of the invention is not changed when the invention is actually carried out.

Further, the above-described embodiments contain various stages of the invention, and various inventions can be extracted by combining a plurality of structural elements disclosed appropriately. For example, as long as the object discussed in the section of the Object to be Achieved by the Invention is achieved, and the advantageous effect discussed in the section of the Advantage of the Invention can be obtained, some of the structural elements can be deleted from all of the elements that are indicated in the embodiments. In this case, these deleted structural elements can be extracted as the invention.

From the modes of carrying out the invention described above, the following inventions can be extracted. It should be noted that the following inventions may be applied solely or in combination with each other in accordance with necessity.

A microscope stage according to an aspect of the present invention includes a fixed stage and a movable stage which is set slidably in contact with a predetermined plane of the fixed stage, and which includes a surface having a large friction coefficient.

The following are preferable embodiments of the microscope stage described above.

(1) The movable stage has a circumferential projection near its outer circumference, and a manipulation member having a surface with a high friction efficient is detachably provided such as to fit with the projection.

(2) The surface having a high friction coefficient is an irregular section formed on a part of the surface of the movable stage.

(3) The movable stage has a sample placement surface on which a sample is placed, at a position higher than the surface with a high friction coefficient.

(4) The fixed stage has such a shape that projects outwards from the movable stage and has a groove in a proximal section of the projecting portion.

(5) The surface with a high friction coefficient includes a manipulation member provided detachably on the stage.

(6) In the structure described in (5), the movable stage has a circumferential projection near its outer circumference and a manipulation member having a surface with a high friction efficient is detachably provided such as to fit with the projection.

(7) In the structure described in (5), the manipulation member has, as a surface having a high friction coefficient, an irregular section formed on a part of the surface.

(8) In the structure described in (5), the manipulation member is an elastic member fixed onto the surface of the movable stage.

(9) In the structure described in (8), the manipulation member is adhered to the surface of the movable stage.

(10) The stage includes an upper surface on which a sample is placed, and the surface with a high friction coefficient is a part of the upper surface of the movable stage.

(11) In the structure described in (10), the movable stage has a circumferential projection near its outer circumference and a manipulation member having a surface with a high friction efficient is detachably provided such as to fit with the projection.

(12) In the structure described in (10), the surface with a high friction efficient is an irregular section formed in a part of the surface of the movable stage.

(13) In the structure described in (10), the surface with a high friction efficient is made of a manipulation member provided detachably to the stage.

(14) In the structure described in (13), the movable stage has a circumferential projection near its outer circumference and a manipulation member having a surface with a high friction efficient is detachably provided such as to fit with the projection.

(15) In the structure described in (13), the manipulation member has, as a surface having a high friction coefficient, an irregular section formed on a part of the surface.

(16) In the structure described in (13), the manipulation member is an elastic member fixed onto the surface of the movable stage.

(17) In the structure described in (16), the manipulation member is adhered to the surface of the movable stage.

According to another aspect of the present invention, there is provided a microscope stage comprising: a fixed stage; and a movable stage which is set slidably in contact with a predetermined plane of the fixed stage, and includes an upper surface on which a sample is placed and a lateral surface, characterized in that a friction coefficient of a par of the upper surface of the movable stage is set to be larger than that of other surfaces. In the microscope stage, it is preferable that a friction coefficient of a part of the lateral surface of the movable stage is set high.

According to the embodiment of the present invention, even in order to move a sample observed at a high magnification finely, or to move a sample observed at a low magnification quickly and largely, the stage can be moved smoothly and at a high response, and this effect can be maintained for a long time.

Further, by providing a member with a high friction resistance is provided detachably, the maintenance property is improved for the case where the manipulation member becomes dirty or degraded.

Furthermore, when the surface of the manipulation member is formed into such a shape that better fits the fingers of a human, the fine movement of the sample can be more smoothly carried out.

As described above, according to the embodiments of the present invention, it is possible to provide a microscope stage that can be finely and smoothly moved and has a mechanism whose operability can be maintained over a long period of time, at a low cost.

According to the present invention, there is provided a microscope stage to be employed in a microscope, or more specifically, a microscope stage on which a sample mainly such as a living thing or living cell is placed, and is moved to observe a desired section thereof under microscope.

What is claimed is:

1. A microscope stage comprising:
a fixed stage; and
a movable stage which is set slidably in contact with a predetermined plane of the fixed stage, said movable stage comprising an upper surface including a substantially horizontal plane and a side surface including a plane at an angle with respect to the upper surface;
wherein the upper surface of the movable stage includes a sample placement part on which a sample is placed, and a manipulation section which is provided outside of the sample placement part and which includes an upper surface having a larger friction coefficient than an upper surface of the sample placement part.

2. The microscope stage according to claim 1, wherein the movable stage comprises a circumferential projection near an outer circumference thereof, and wherein the manipulation section is detachably provided so as to fit with the projection.

3. The microscope stage according to claim 1, wherein the upper surface of the manipulation section comprises an irregular section.

4. The microscope stage according to claim 1, wherein the upper surface of the sample placement part is elevated with respect to the upper surface of the manipulation section.

5. The microscope stage according to claim 1, wherein the fixed stage comprises a projecting portion that projects outwards with respect to the movable stage, and a groove in an inner section of the fixed stage with respect to the projecting portion.

6. The microscope stage according to claim 1, wherein the manipulation section is provided detachably on the movable stage.

7. The microscope stage according to claim 6, wherein the manipulation section comprises an elastic member fixed onto the upper surface of the movable stage.

8. The microscope stage according to claim 7, wherein the manipulation section is adhered to the upper surface of the movable stage.

9. A microscope stage comprising:
a fixed stage; and
a movable stage which is set slidably in contact with a predetermined plane of the fixed stage, said movable stage comprising a sample placement section including a substantially horizontal plane and a manipulation section having an upper surface that is substantially horizontal to the sample placement section;
wherein the upper surface of the manipulation section has a larger friction coefficient than an upper surface of the sample placement section.

10. The microscope stage according to claim 9, wherein the movable stage comprises a circumferential projection near an outer circumference thereof, and wherein the manipulation section is detachably provided so as to fit with the projection.

11. The microscope stage according to claim 9, wherein the upper surface of the manipulation section comprises an irregular section.

12. The microscope stage according to claim 9, wherein the upper surface of the sample placement section is elevated with respect to the upper surface of the manipulation section.

* * * * *